US011861513B2

(12) United States Patent
Sekiguchi et al.

(10) Patent No.: US 11,861,513 B2
(45) Date of Patent: Jan. 2, 2024

(54) METHODS FOR DETECTING AND MONITORING BIAS IN A SOFTWARE APPLICATION USING ARTIFICIAL INTELLIGENCE AND DEVICES THEREOF

(71) Applicant: International Business Machines Corporation, Armonk, NY (US)

(72) Inventors: Kazuki Sekiguchi, Tokyo (JP); Fumihiko Terui, Tokyo (JP); Pinaki Chandra Dey, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 16/927,501

(22) Filed: Jul. 13, 2020

(65) Prior Publication Data
US 2022/0012610 A1    Jan. 13, 2022

(51) Int. Cl.
G06N 5/04         (2023.01)
G06F 11/34        (2006.01)
G06N 20/00        (2019.01)

(52) U.S. Cl.
CPC .............. G06N 5/04 (2013.01); G06F 11/34 (2013.01); G06N 20/00 (2019.01)

(58) Field of Classification Search
CPC ........... G06N 5/04; G06N 20/00; G06F 11/34
See application file for complete search history.

(56) References Cited

U.S. PATENT DOCUMENTS

| | | | |
|---|---|---|---|
| 8,380,017 B2 | 2/2013 | Sugiyama | |
| 10,235,638 B2 * | 3/2019 | Maheshwari | G06N 20/00 |
| 10,503,348 B2 * | 12/2019 | Maheshwari | G06T 11/206 |
| 10,861,028 B2 * | 12/2020 | Silberman | G06Q 10/067 |
| 10,990,901 B2 * | 4/2021 | Deo | G06N 20/00 |
| 11,501,238 B2 * | 11/2022 | Fletcher | G06Q 10/06393 |
| 11,521,115 B2 * | 12/2022 | Weider | G06N 20/00 |
| 11,537,941 B2 * | 12/2022 | Weider | G06F 16/285 |
| 2006/0161403 A1 * | 7/2006 | Jiang | G06N 20/00 703/2 |
| 2008/0094092 A1 | 4/2008 | Goodnow et al. | |

(Continued)

FOREIGN PATENT DOCUMENTS

| | | |
|---|---|---|
| CN | 101166024 A | 4/2008 |
| CN | 109978143 A | 7/2019 |

(Continued)

OTHER PUBLICATIONS

Adebayo, 2016.*

(Continued)

*Primary Examiner* — Michael I Ezewoko
(74) *Attorney, Agent, or Firm* — Matthew Zehrer

(57) ABSTRACT

A computer-implemented method for detecting and monitoring bias in an application includes index training data and obtaining a plurality of correlation values of one or more features in the indexed training data with a target variable. For each of the one or more features, a first value and a favorable result and a second value along with the unfavorable result is calculated. An absolute value of a difference between the calculated first value and the calculated second value is calculated. A total sum of the calculated absolute value of the plurality of correlation values of the one of the one or more features is calculated.

22 Claims, 9 Drawing Sheets

(56) References Cited

U.S. PATENT DOCUMENTS

| | | | |
|---|---|---|---|
| 2015/0371191 A1 | 12/2015 | Taylor et al. | |
| 2017/0330058 A1 | 11/2017 | Silberman et al. | |
| 2019/0098039 A1 | 3/2019 | Gates et al. | |
| 2019/0228006 A1* | 7/2019 | Tormasov | H04L 9/3239 |
| 2020/0081865 A1* | 3/2020 | Farrar | G06N 20/00 |
| 2020/0167653 A1* | 5/2020 | Manjunath | G06N 3/082 |
| 2020/0302524 A1* | 9/2020 | Kamkar | G06N 20/20 |

FOREIGN PATENT DOCUMENTS

| | | |
|---|---|---|
| WO | 2014152469 A1 | 9/2014 |
| WO | 2017180608 A1 | 10/2017 |

OTHER PUBLICATIONS

Cabrera, Apr. 2019 (Ángel Alexander Cabrera, Will Epperson, Fred Hohman, Minsuk Kahng, Jamie Morgenstern, Duen Horng Chau: FairVis: Visual Analytics for Discovering Intersectional Bias in Machine Learning. arXiv preprint (Apr. 2019). arXiv: 1904.05419 or or arXiv:1904.05419v1).*

Adebayo, 2016, pp. 3-99.*

Cabrera, Apr. 2019 (Ángel Alexander Cabrera, Will Epperson, Fred Hohman, Minsuk Kahng, Jamie Morgenstern, Duen Horng Chau: FairVis: Visual Analytics for Discovering Intersectional Bias in Machine Learning. arXiv preprint (Apr. 2019). arXiv:1904.05419 or or arXiv:1904.05419v1), sections 1-8.*

Bionformatics, The Machine Learning Approach, Baldi, MIT Press, 1999, pp. xi-5.*

Counterfactual-Explanations-Wachter, Harvard Journal of Law & Technology, 2018, pp. 841-887.*

Fairness and Abstraction in Sociotechnical Systems, Selbst, Association for Computing Machinery. 2019, pp. 59-68.*

Mind Over Machine, Drefus, Macmillan, 1986, pp. 1-66.*

Practical Wisdom, Schwartz, Penguim, 2010, pp. 81-154.*

The Hidden Biases in Big Data, Kate Crawford, Harvard Business Review 2013, pp. 1-5.*

What Computers Can't Do, Dreyfus, Harper & Row, 1972, pp. 75-117.*

Automated Data Slicing for Model Interpretability, Chung, Association for Computing Machinery, 2018, sections 1-4.*

Intersectional Accuracy Disparities in Commercial Gender Classification, Buolamwini, Proceedings of Machine Learning Research 81, 2018, pp. 1-15.*

IBM Cloud Docs / Watson OpenScale. Fairness metrics overview. Sep. 9, 2019. https://cloud.ibm.com/docs/ai-openscale?topic=ai-openscale-anlz_metrics_fairness.

Susannah Shattuck. Making monitoring AI bias a little easier. IBM Big Data & Analytics Hub. Jun. 17, 2019. https://www.ibmbigdatahub.com/blog/watson-openscale-bias-monitors.

International Business Machines Corporation (Nov. 7, 2019) "Fairness metrics overview", IBM Watson OpenScale. <https://cloud.ibm.com/docs/ai-openscale?topic=ai-openscale-anlz_metrics_fairness>.

International Business Machines Corporation (Jan. 8, 2020) "Manage production AI with trust and confidence in outcomes", IBM Watson OpenScale. <https://www.ibm.com/cloud/watson-openscale>.

Examination Report dated May 30, 2023 in related Australian Patent Application No. AU2021308328.

International Search Report and Written Opinion dated Sep. 28, 2021 in related International Patent Application No. PCT/IB2021/055538.

* cited by examiner

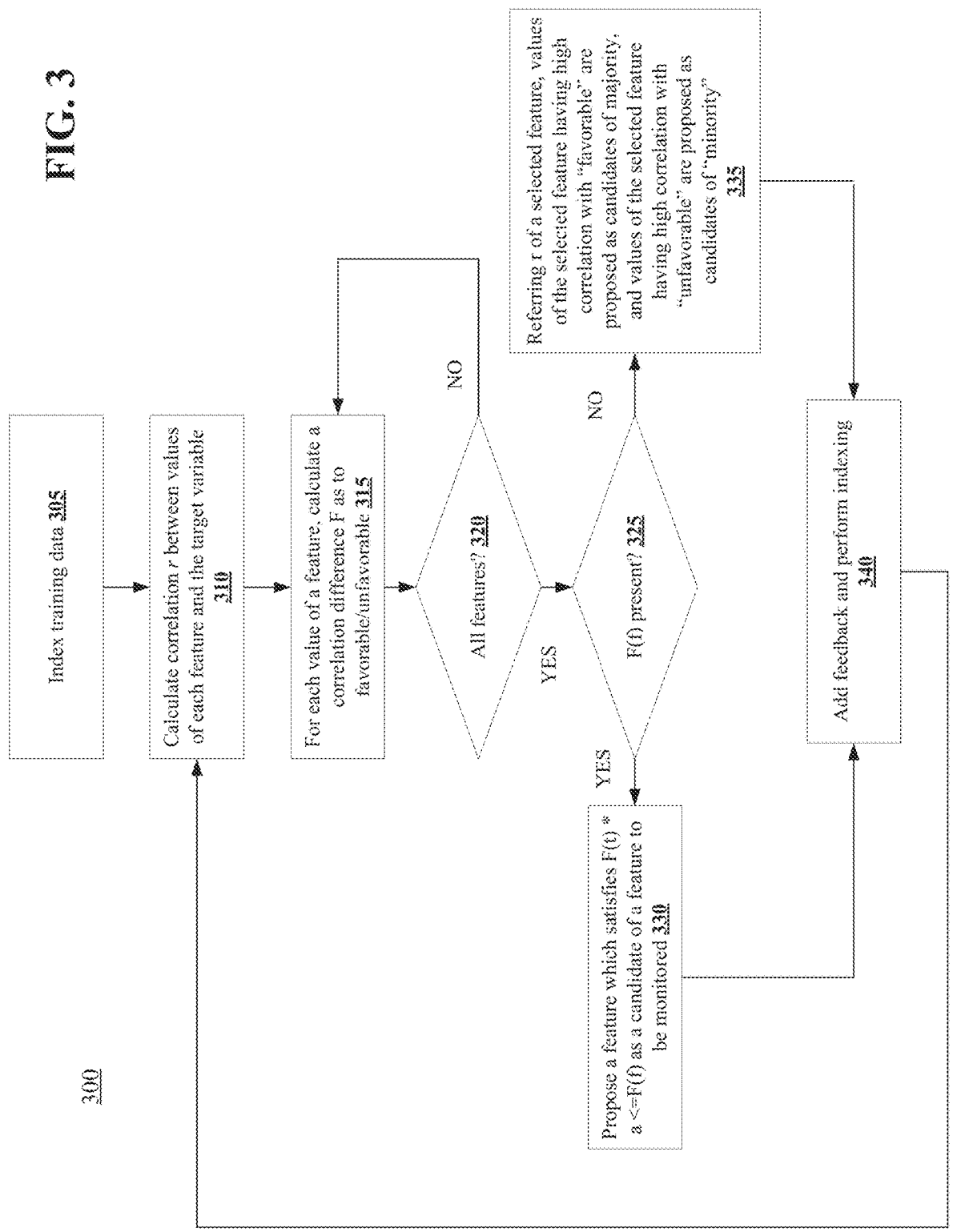

FIG. 4A

METHODS FOR DETECTING AND MONITORING BIAS IN A SOFTWARE APPLICATION USING ARTIFICIAL INTELLIGENCE AND DEVICES THEREOF

TECHNICAL FIELD

The present application generally relates to managing software applications, and more particularly, to detect and monitor bias in a software application using artificial intelligence and devices thereof.

BACKGROUND

Different types or formats of data are generally used by a human or a computer to make decisions. For example, a bank, may base a decision on whether to extend a particular amount of credit to a person or a business based on a credit score, prior credit history, income, and other demographic information. Unfortunately, such decisions may include some form of bias (e.g., implicit bias) such that, even if an institution considers their decision-making process to be impartial, the results may in fact be biased. Bias refers to making a decision using a decision-making process where the decision favors or disfavors certain traits or characteristics, such as gender, age, ethnicity, geographic location, or income. As a result, bias can creep into the rules used for approval or denial of an application, such as a credit application and this bias may be difficult to detect. Existing technologies tries to solve the technological problem of detecting bias in a decision made by a computer by requiring an employee, for example a data scientist, to manually review the data set, correspond to rules, and correlate the data, rules to the decision to detect a bias. However, the technique used by the existing technologies do not fully solve the technological problem as it requires manual intervention which in turn leads to errors. Moreover, it is very difficult for a user to find which feature is potentially biased by himself/herself.

It is desired to provide a new system and method for detect and monitor bias in an application to solve the above problems.

SUMMARY

Embodiments provide a computer-implemented method for monitoring and detecting bias in an application using artificial intelligence includes, indexing training data and obtaining a plurality of correlation values of one or more features in the indexed training data with a target variable. For each of the one or more features, a first value and a favorable result and a second value along with the unfavorable result is calculated. An absolute value of a difference between the calculated first value and the calculated second value is calculated. A total sum of the calculated absolute value of the plurality of correlation values of the one of the one or more features is calculated.

Embodiments further provide a computer-implemented method, further comprising indexing feedback data received from a client device.

Embodiments further provide a computer-implemented method, further comprising obtaining training data from a training data server.

Embodiments further provide a computer-implemented method, further comprising calculating a second total sum of the calculated absolute value of the plurality of correlation values of the one of the one or more features for the feedback data.

Embodiments further provide a computer-implemented method, further comprising presenting a correlation change value determined by a difference between the calculated total sum of the calculated absolute value associated with the training data and the calculated total sum of the calculated absolute value associated with the feedback data.

Embodiments further provide a computer-implemented method wherein the correlation change value represents a candidate of a feature to be monitored.

Embodiments further provide a non-transitory computer readable medium including, indexing training data and obtaining a plurality of correlation values of one or more features in the indexed training data with a target variable. For each of the one or more features, a first value and a favorable result and a second value along with the unfavorable result is calculated. An absolute value of a difference between the calculated first value and the calculated second value is calculated. A total sum of the calculated absolute value of the plurality of correlation values of the one of the one or more features is calculated.

In another illustrative embodiment, a non-transitory computer readable medium comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 is an exemplary flowchart illustrating a method 300 for detecting and monitoring bias in a software application;

FIGS. 4A-4B are exemplary images of connecting with training data;

DETAILED DESCRIPTION OF EXEMPLARY EMBODIMENTS

The present invention may be a system, a method, and/or a computer program product for detecting and monitoring bias in a software application using artificial intelligence (AI). The computer program product may include a computer-readable storage medium (or media) having computer-readable program instructions thereon for causing a processor to carry out aspects of the present invention.

Figure 1:
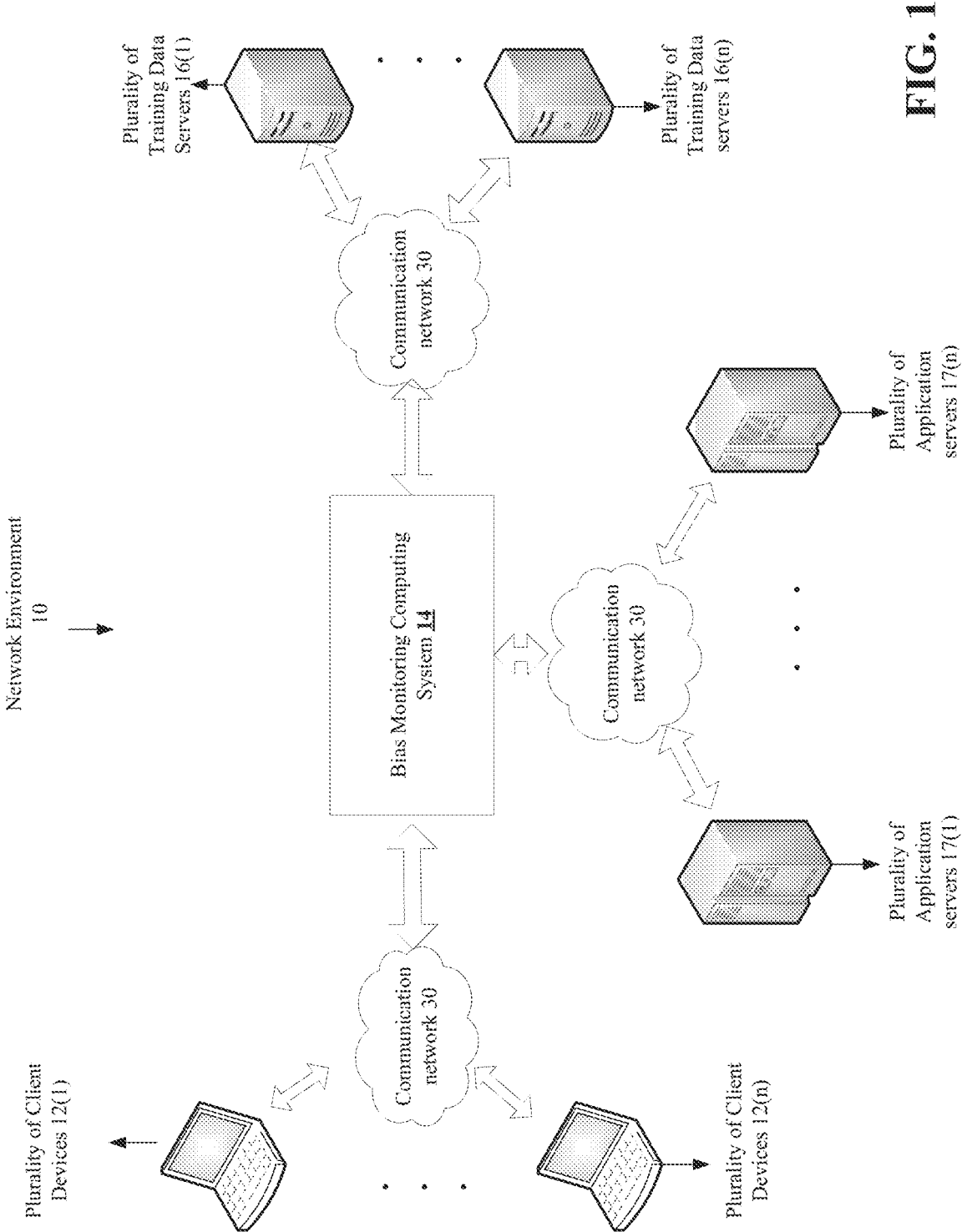
FIG. 1 is an example of a block diagram of a network environment 10 including a bias monitoring computing system 14 for detect and monitor bias in a software application using artificial intelligence.
Figure 2:
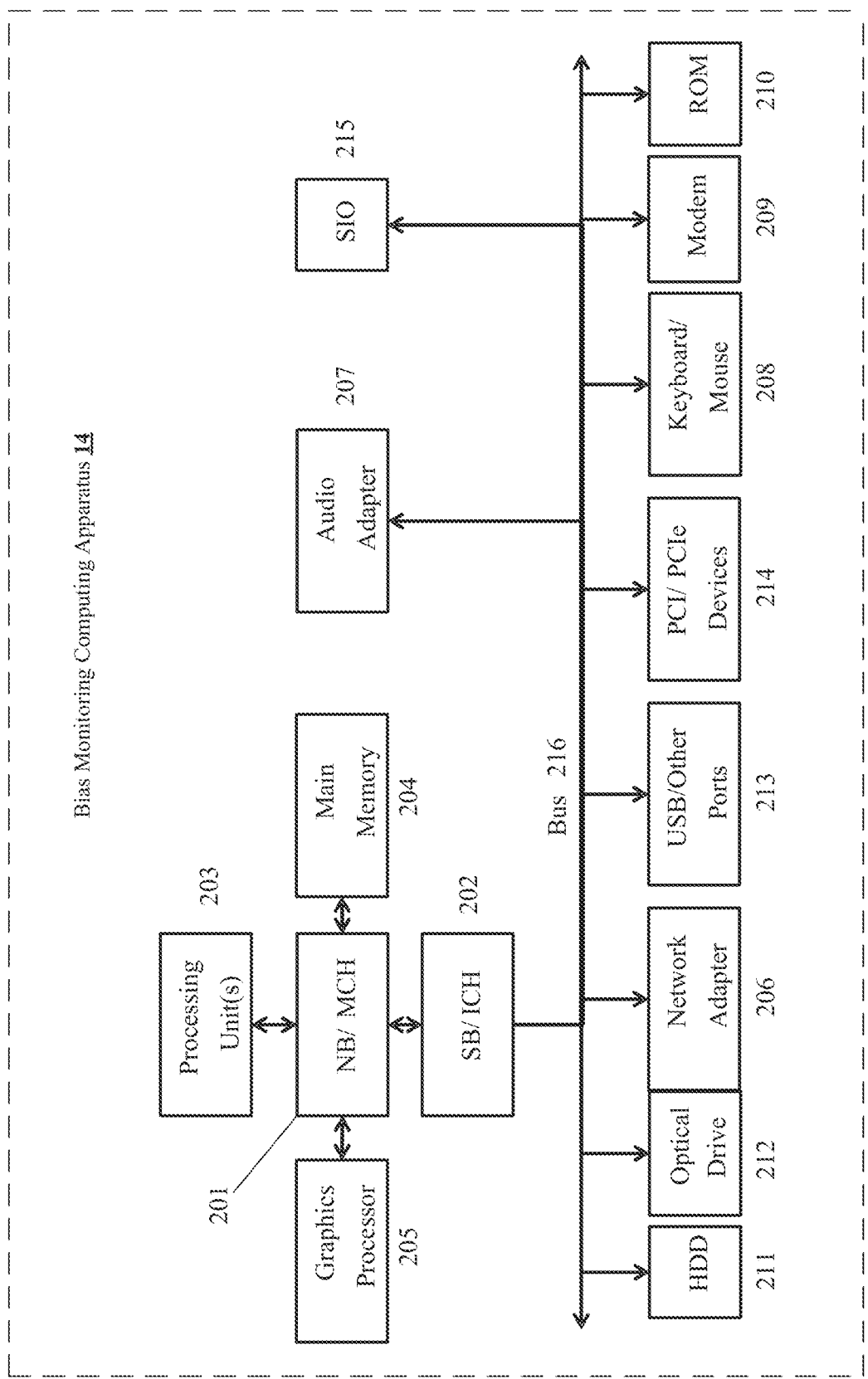
FIG. 2 is an example of a block diagram of a bias monitoring computing system 14.

A network environment 10 with an example of a bias monitoring computing system 14 is illustrated in FIGS. 1-2. In this particular example, the environment 10 includes the bias monitoring computing system 14, a one or more client devices 12(1)-12(n), one or more training data servers 16(1)-16(n), and a one or more application servers 17(1)-17(n) coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and systems that detect and monitor bias in a software application using artificial intelligence (AI).

Referring more specifically to FIGS. 1-2, the bias monitoring computing system 14 is programmed to detect and monitor bias in an application using artificial intelligence. Now referring to FIG. 2, the bias monitoring computing system 14 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read-only memory (ROM) 210, hard disk drive (HDD) 211, optical drive (CD or DVD) 212, universal serial bus (USB) ports and other communication ports 213, and the PCI/PCIe devices 214 can connect to the SB/ICH 702 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the bias monitoring computing system 14. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the bias monitoring computing system 14 can be an IBM® eServer™ System p running the Advanced Interactive Executive operating system or the Linux operating system. The bias monitoring computing system 14 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the full question generation system can be performed by the processing unit 703 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the bias monitoring computing system 14 includes several components that would not be directly included in some embodiments illustrated in FIGS. 3-6C. However, it should be understood that the embodiments illustrated in FIGS. 3-6C may include one or more of the components and configurations of the bias monitoring computing system 14 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the bias monitoring computing system 14 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

Referring back to FIG. 1, each of the one or more client devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements. In this example, the bias monitoring computing system 14 interacts with the one or more client devices 12(1)-12(n) via the communication network 30 to receive requests to access applications executing on the one or more application servers 17(1)-17(n), although the bias monitoring computing system 14 can receive other types or requests.

Each of the one or more training data servers 16(1)-16(n) may store and provide training data to the bias monitoring computing system 14 via one or more of the communication networks 30, for example, although other types and/or numbers of storage media in other configurations could be used. In this particular example, each of the one or more training data servers 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of data servers 16(1)-16(n) and may transmit data in response to requests from the bias monitoring computing system 14. Each the one or more training data servers 16(1)-16(n) may include a processor, a memory, and a communication interface, which are coupled together by a bus or other link, although each may have other types and/or numbers of other systems, devices, components, and/or other elements.

Each of the one or more application servers 17(1)-17(n) may store and provide access to the applications executing to the one or more client devices 12(1)-12(n) via the bias monitoring computing system 14 via one or more of the communication networks 30, for example, although other types and/or numbers of storage media in other configurations could be used. In this particular example, each of the plurality of data servers 17(1)-17(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of data servers 17(1)-17(n) and may transmit data in response to requests from the bias monitoring computing system 14. Each the plurality of data servers 17(1)-17(n) may include a processor, a memory, and a communication interface, which are coupled together by a bus or other link, although each may have other types and/or numbers of other systems, devices, components, and/or other elements.

The non-transitory computer readable storage medium can be a tangible device that can retain and store instructions for use by an instruction execution device. The non-transitory computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A non-transitory computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The non-transitory computer readable program instructions described herein can be downloaded to respective computing/processing devices from a computer readable storage medium or to an external computer or external storage device via a communication network 30, for example, the Internet, a local area network (LAN), a wide area network (WAN) and/or a wireless network. The communication network 30 may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of communication network 30, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

Figure 4A:
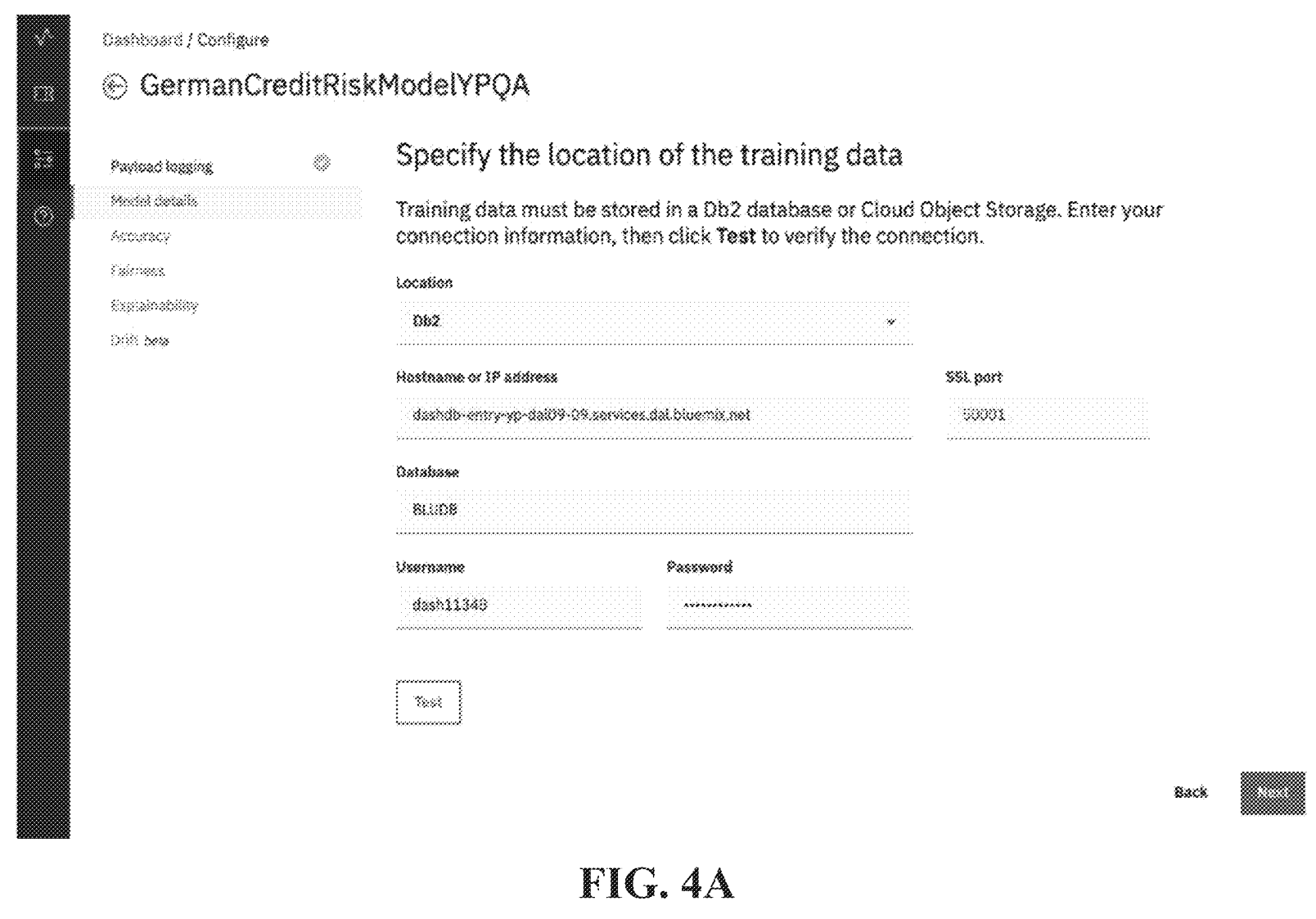
Figure 4B:
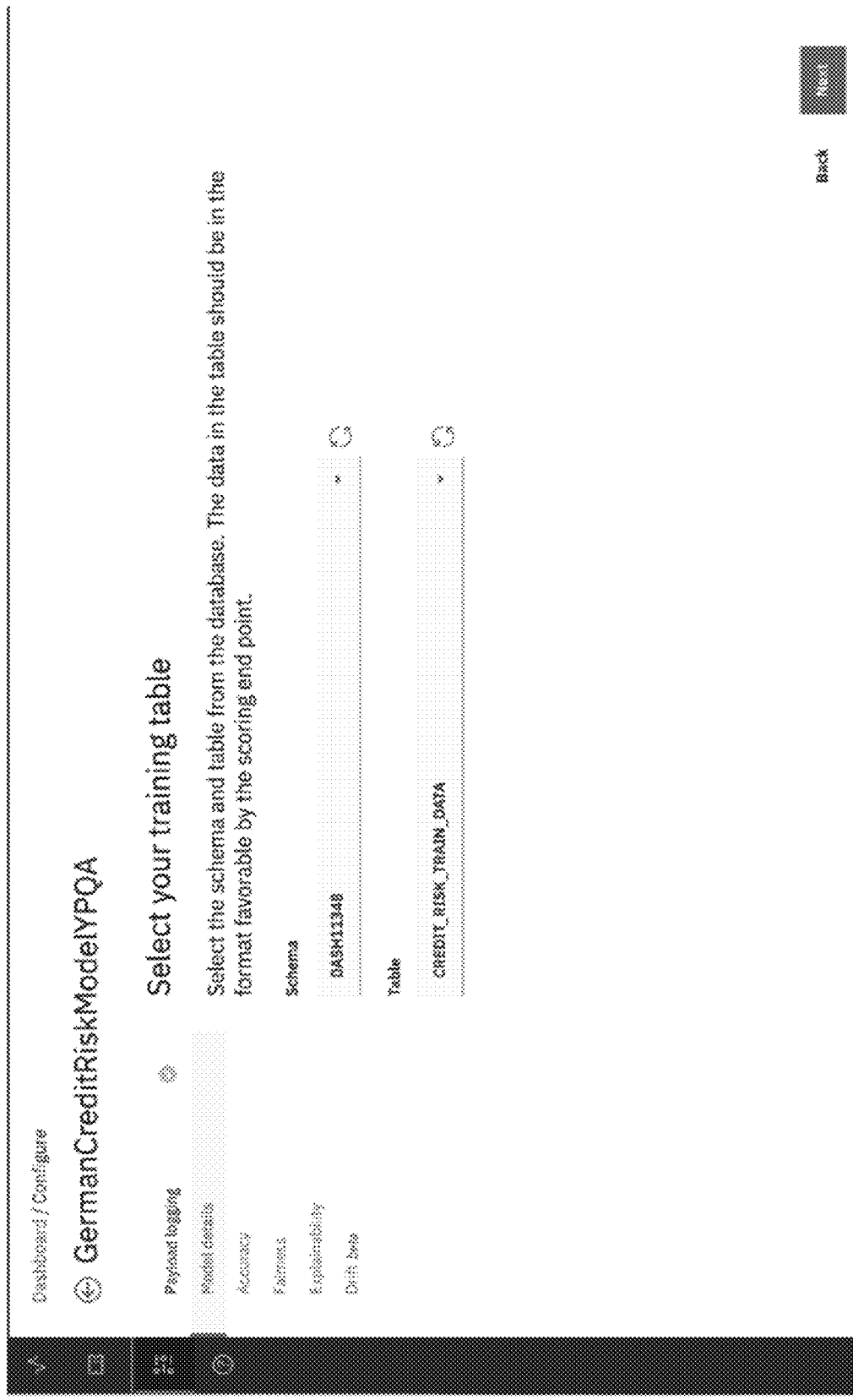

An exemplary method for detecting and monitoring will now be illustrated with reference to FIGS. 3-6C. Referring particularly with reference to FIG. 3, the exemplary method 300 begins at step 305 where the bias monitoring computing system 14 indexes training data to enable instant word searching. In this example, indexing on the training data can be done by applying a full text search index that allows calculation of the correlation between values of a feature of an application and a target variable. By indexing the training data, the disclosed technology is able to search the feature value that has a high correlation with the target variable and that can also be adapted to additional data. In this example, the bias monitoring computing system 14 can obtain the training data from one of the one or more training data servers 16(1)-16(n), although the training data can be obtained from other memory locations. An example of the step 305 will now be further illustrated with reference to FIGS. 4A and 4B. As illustrated in FIG. 4A, the bias monitoring computing system 14 enters the hostname or the internet protocol (IP) address, secure socket layer (SSL) port, and the database present in one of the one or more training data servers 16(1)-16(n) to get the training data. Next, as illustrated in FIG. 4B, the bias monitoring computing apparatus 14 selects the specific training data from the training table by including the name of the schema and the table, although other types of information can be included. In this example, the artificial intelligence models are supervised learning models and the model types can be binary classification, multi-class classification or regression. Further in this example, the input training data can be structured data.

Next in step 310, the bias monitoring computing system 14 determines the correlation between vales of each feature and a target variable using the indexed data and the trained artificial intelligence models illustrated above in step 305. By way of example, the target variable relates to the predicted values by machine learning.

Next in step 315, the bias monitoring computing system 14 for each value of a feature, calculates a correlation difference F as to determine if they are favorable or unfavorable. In this example, favorable relates to preferred or desired result of judgement the machine learning model and unfavorable relates to non-preferred or undesired result of judgement by the machine learning model. By way of example, in a two-value classification model of approval/rejection of loan application, an approval corresponds to favorable, and a rejection corresponds to unfavorable. In this example, the bias monitoring computing system 14 uses below described formula to calculate the first value, the second value, the absolute value, and the total sum and correlate:

$$r(\text{feature, favorable}) = \frac{(\text{\# of favorable w/the feature value})/(\text{\# of that feature value})}{(\text{total \# of favorable})/(\text{total \# of records})}$$

An example of the use of the above formula will now be illustrated. The favorable and unfavorable values in this example are either "No Risk" or "Risk". By way of example, if there are values M and F for the values associated with Gender and if there are a total of 50 records of which 20 records have gender as M and favorable values being "No Risk", 15 records with gender as "F" and favorable value is "No risk", 10 records having gender M and unfavorable value as "Risk" and 5 records that have gender as F and unfavorable value as Risk; then calculating "No Risk" as a target variable and gender M as the feature value in the gender data would give a value of 0.95 ((20)/(20+10))/((20+15)/(50))=0.95.

In step 320, the bias monitoring computing system 14 determines if the calculation of correlation is performed for all features. If the bias monitoring computing system 14 determines that the calculation of correlation has not been performed for all the features, then the No branch is taken to step 315. However, when the bias monitoring computing system 14 determines that the calculation of correlation is performed for all features, then the Yes branch is taken to step 325.

In step 325, the bias monitoring computing system 14 presents the tendency per feature and determines if a correlation value calculated using feedback data. i.e., F(f), is present. If the bias monitoring computing system 14 determines that F(f) is present, then the Yes branch is taken to step 330. In this example, the value of F per feature illustrated in step 315 is obtained by the following formula with r (feature, favorable/unfavorable) for each value in the feature. F=sum (|r(feature, favorable)−r(feature, unfavorable)|). Accordingly, F is determined for each feature and the tendency per feature is useful for selecting a feature to be monitored.

Figure 5:
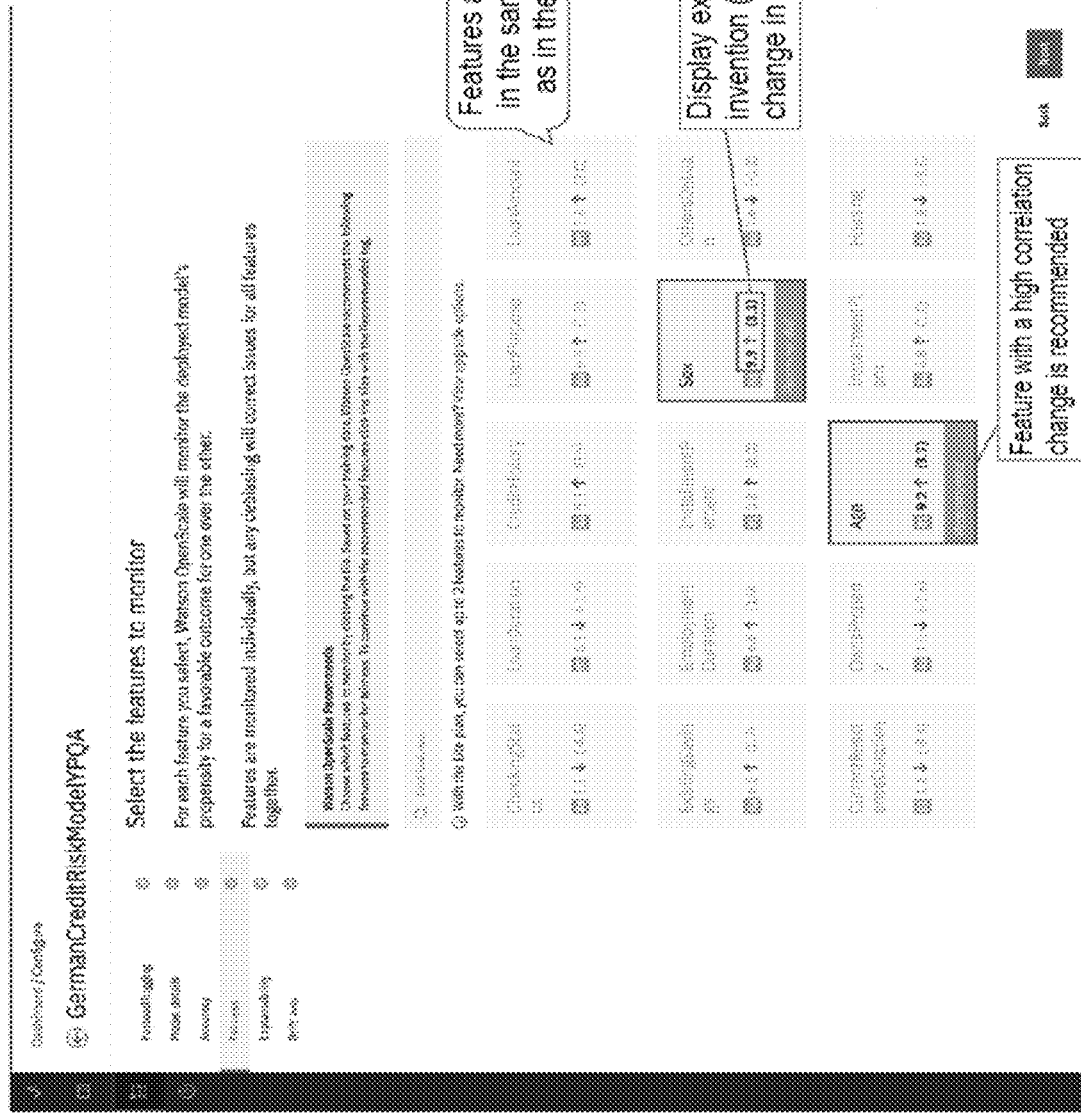
FIG. 5 is an exemplary image illustrating changes in correlation values of features and proposal for monitoring.

In step 330, the bias monitoring computing system 14 proposes a feature which satisfies F(t)*a<=F(f) as a candidate of a feature to be monitored. In this example, F(t) means F calculated with training data and F(f) means F calculated with feedback data and the formula is used for each feature where a can take any value. An example of step 330 is illustrated in FIG. 5 and the exemplary flow proceeds to step 340 which will be further illustrated below. As illustrated in FIG. 5, the bias monitoring computing system 14 proposes the gender and age as the feature that satisfies the above illustrated formula.

Figure 6A:
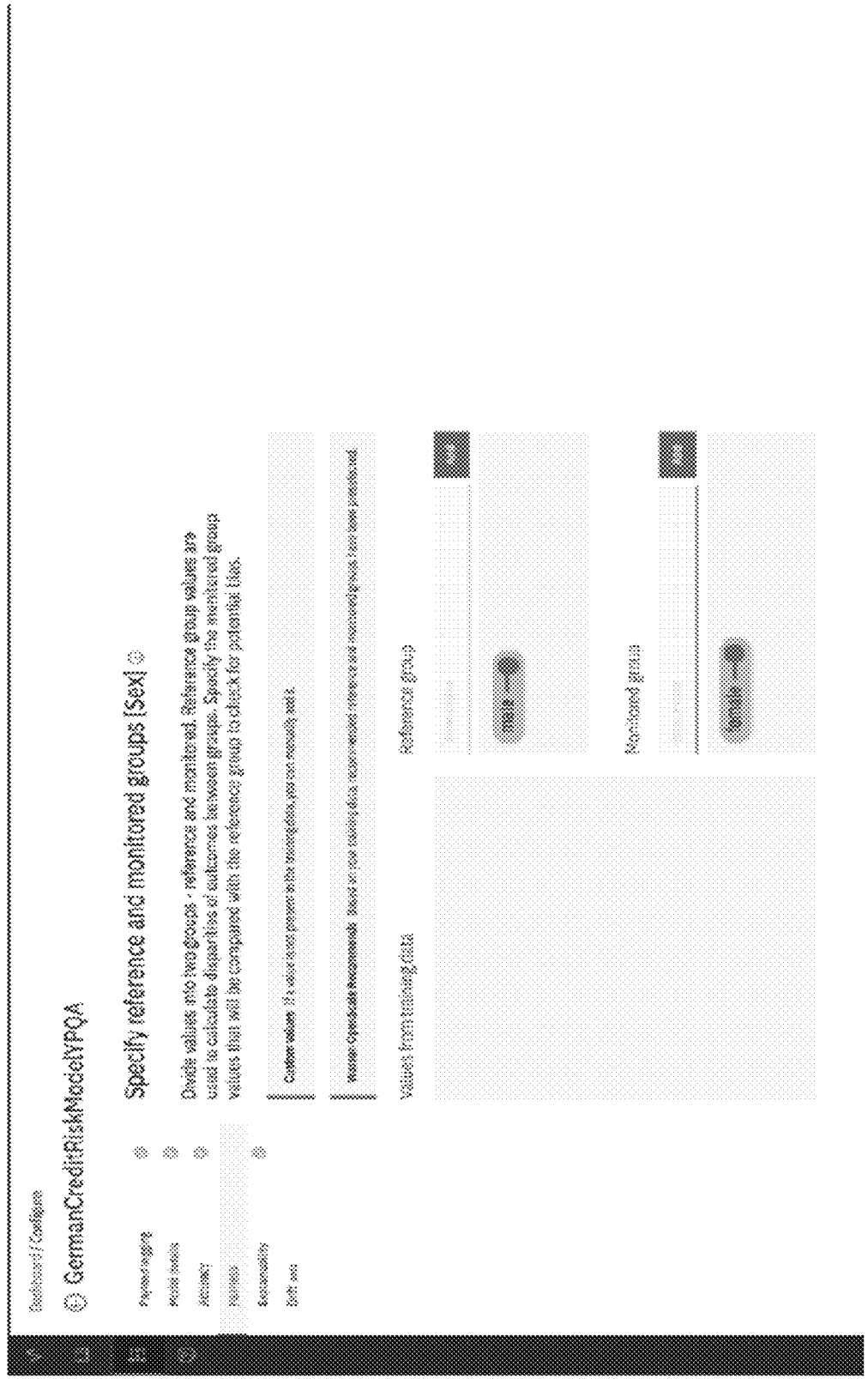
FIGS. 6A-6C are exemplary images illustrating proposal of favorable or unfavorable software applications.
Figure 6B:
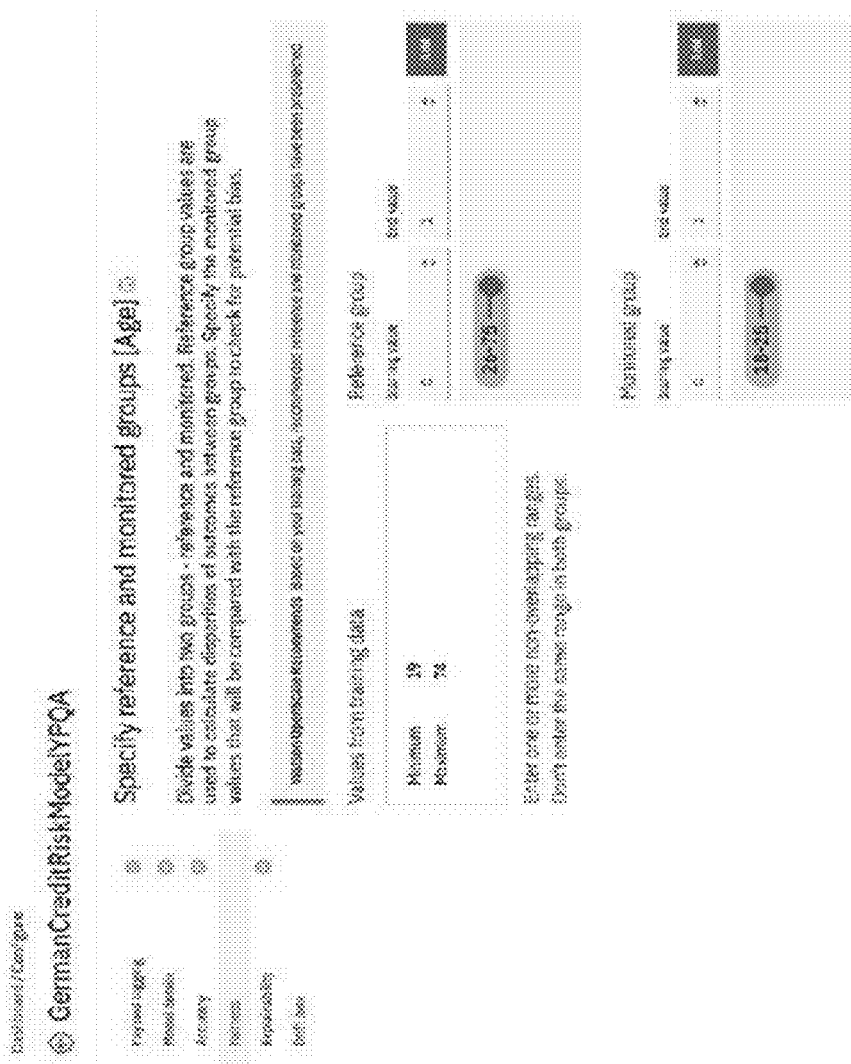
Figure 6C:
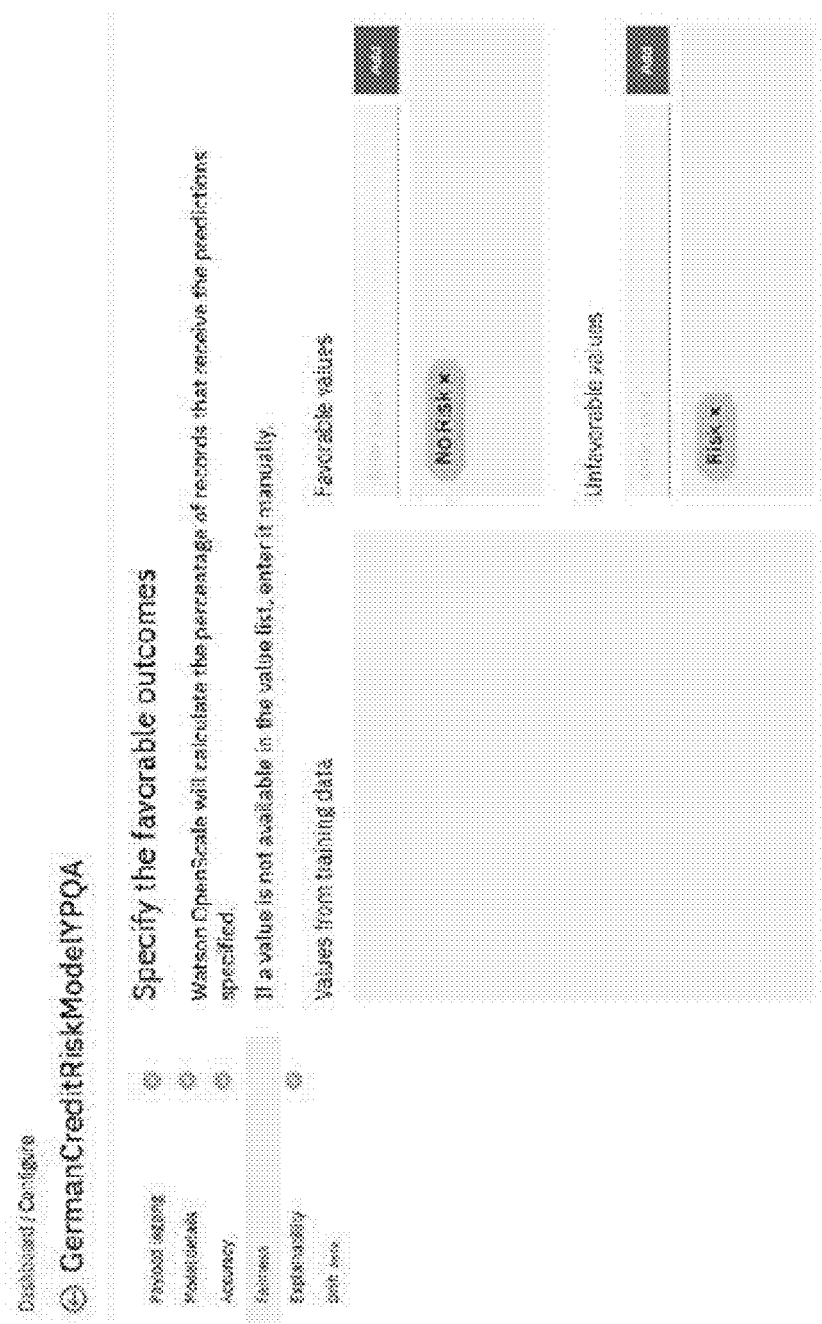

However in step 325, if the bias monitoring computing system 14 determines that F(f) is not present, then the No branch is taken to step 335. In step 335, the bias monitoring computing system 14 referring 'r' of a selected feature, values of the selected feature having high correlation with favorable are proposed as candidates of majority, and values of the selected feature having high correlation with unfavorable are proposed as candidates of minority as illustrated in FIGS. 6A-6C. By way of example, majority relates to a feature value group that will be more likely to contribute to favorable and minority relates to a feature group value that will be more likely to contribute to unfavorable. Taking gender as an example of a feature in two-value classification model of approval/rejection of loan application, males belong to majority and females belong to minority. Alternatively, taking an annual income as an example of a feature, a person with an annual income of 10 million JPY or more belongs to majority, and a person with an annual income of 3 million JPY or less belongs to minority.

By way of example, if the favorable and unfavorable values are "No Risk" and "Risk", "M" and "F" are the values associated with the gender; if number of total records is 50 out of which if there are 20 records that have "M" as "Gender" column and "No Risk", 15 records that have "F" as "Gender" column and "No Risk" as target variable, 10 records that have "M" as "Gender" column and "Risk" as target variable; and 5 records that have "F" as "Gender" column and "Risk" as target variable; and Gender is selected as monitored feature, then the value is r is calculated as follows: r("M", "No Risk")=((20)/(20+10))/((20+15)/(50)) =0.95; r ("F", "No Risk")=((15)/(15+5))/((20+15)/(50)) =1.07; r ("M", "Risk")=((10)/(20+10))/((10+5)/(50))=1.11; and r ("F", "Risk")=((5)/(15+5))/((10+5)/(50))=0.83. Accordingly, in this illustrative example, the value of the selected feature having high correlation with favorable ("No Risk") is "F", then "F" is proposed as candidates of majority. On the other hand, the value of the selected feature having high correlation with unfavorable ("Risk") is "M", then "M" is proposed as candidates of minority.

Next in step 340, the bias monitoring computing system 14 provides the feedback data and indexes data and the exemplary flow proceeds to step 310. In this example, feedback data is the new data that is in the same format as the training data and that is the right answer data to be added that should have been predicted by the model in response to the actual input to the model. Additionally, feedback data can be provided any number of times.

By using the above illustrated techniques, the disclosed technology is able to accurately identify the feature that has potential bias that otherwise may not be identified by a human, such as a data scientist. Additionally, indexing training data allows adding new data easily and supports efficient computation. Even when an error in the setting of the target variable or the like is noticed and the setting is changed, preparing the index separate from the model actually used enables calculating the correlation dynamically and thus the index is useful. Additionally, the disclosed technology can be applied also to new data and thus can also handle changes in the features according to the trend of the times.

By way of example, if Age is not selected as a monitored feature in an application when applying the disclosed technology to the training data; and the Age feature satisfies F(t)*a<=F(f) in step 330 when applying the disclosed technology to the new data called feedback data, then Age is newly recommended as a candidate of a feature to be monitored. Accordingly, by applying the disclosed technology every time new data is added, the candidates of feature to be monitored are proposed from the latest calculation results and also the changes in tendency for each feature are detected. This technology with new data makes it possible to find the feature that could not be identified in training data but has potential bias.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for monitoring and detecting bias in an application, the method comprising:
indexing, by a bias monitoring computing system, training data;
obtaining, by the bias monitoring computing system, a plurality of correlation values of one or more features in the indexed training data with a target variable; and
for each of the one or more features:
calculating, by the bias monitoring computing system, a first value of correlation of the plurality of correlation values of the one of the one or more features and a favorable result of a judgement by a trained artificial intelligence model;
calculating, by the bias monitoring computing system, a second value of correlation of the plurality of correlation values of the one of the one or more features and a unfavorable result of a judgement by the trained artificial intelligence model;

calculating, by the bias monitoring computing system, an absolute value of a difference between the calculated first value and the calculated second value;

calculating, by the bias monitoring computing system, a total sum of the calculated absolute value of the plurality of correlation values of the one of the one or more features; and identifying and monitoring, by the bias monitoring computing system, a bias in the one or more features using the calculated first value, the second value, the absolute value, and the total sum.

2. The method as set forth in claim 1, further comprising: indexing, by the bias monitoring computing system, feedback data received from a client device.

3. The method as set forth in claim 1, further comprising, obtaining, by the bias monitoring computing system, training data from a training data server.

4. The method as set forth in claim 2, further comprising, calculating, by the bias monitoring computing system, a second total sum of the calculated absolute value of the plurality of correlation values of the one of the one or more features for the feedback data.

5. The method as set forth in claim 4, further comprising, presenting, by the bias monitoring computing system, a correlation change value determined by a difference between the calculated total sum of the calculated absolute value associated with the training data and the calculated total sum of the calculated absolute value associated with the feedback data.

6. The method as set forth in claim 5, wherein the correlation change value represents a candidate of a feature to be monitored.

7. A non-transitory machine readable medium having stored thereon instructions comprising machine executable code which when executed by at least one machine causes the machine to:

index training data;

obtain a plurality of correlation values of one or more features in the indexed training data with a target variable; and for each of the one or more features:

calculate a first value of correlation of the plurality of correlation values of the one of the one or more features and a favorable result of a judgement by a trained artificial intelligence model;

calculate a second value of correlation of the plurality of correlation values of the one of the one or more features and a unfavorable result of a judgement by the trained artificial intelligence model;

calculate an absolute value of a difference between the calculated first value and the calculated second value;

calculate a total sum of the calculated absolute value of the plurality of correlation values of the one of the one or more features; and identify and monitor a bias in the one or more features using the calculated first value, the second value, the absolute value, and the total sum.

8. The medium as set forth in claim 7, further comprising, indexing feedback data received from a client device.

9. The medium as set forth in claim 7, further comprising, obtaining training data from a training data server.

10. The medium as set forth in claim 8, further comprising, calculating a second total sum of the calculated absolute value of the plurality of correlation values of the one of the one or more features for the feedback data.

11. The medium as set forth in claim 10, further comprising, presenting a correlation change value determined by a difference between the calculated total sum of the calculated absolute value associated with the training data and the calculated total sum of the calculated absolute value associated with the feedback data.

12. The medium as set forth in claim 11, wherein the correlation change value represents a candidate of a feature to be monitored.

13. A bias monitoring computing system, comprising a memory comprising programmed instructions stored in the memory and one or more processors configured to be capable of executing the programmed instructions stored in the memory to:

index training data;

obtain a plurality of correlation values of one or more features in the indexed training data with a target variable; and for each of the one or more features:

calculate a first value of correlation of the plurality of correlation values of the one of the one or more features and a favorable result of a judgement by a trained artificial intelligence model;

calculate a second value of correlation of the plurality of correlation values of the one of the one or more features and a unfavorable result of a judgement by the trained artificial intelligence model;

calculate an absolute value of a difference between the calculated first value and the calculated second value;

calculate a total sum of the calculated absolute value of the plurality of correlation values of the one of the one or more features; and identify and monitor a bias in the one or more features using the calculated first value, the second value, the absolute value, and the total sum.

14. The system as set forth in claim 13 wherein the one or more processors are further configured to be capable of executing the programmed instructions stored in the memory to index feedback data received from a client device.

15. The system as set forth in claim 13 wherein the one or more processors are further configured to be capable of executing the programmed instructions stored in the memory to obtain training data from a training data server.

16. The system as set forth in claim 14 wherein the one or more processors are further configured to be capable of executing the programmed instructions stored in the memory to calculate a second total sum of the calculated absolute value of the plurality of correlation values of the one of the one or more features for the feedback data.

17. The system as set forth in claim 16 wherein the one or more processors are further configured to be capable of executing the programmed instructions stored in the memory to present a correlation change value determined by a difference between the calculated total sum of the calculated absolute value associated with the training data and the calculated total sum of the calculated absolute value associated with the feedback data.

18. The system as set forth in claim 17 wherein the correlation change value represents a candidate of a feature to be monitored.

19. The system as set forth in claim 13 wherein the one or more processors are further configured to be capable of executing the programmed instructions stored in the memory to provide the identified and monitored the one or more features with the bias to a client device.

20. The system as set forth in claim 19 wherein the one or more processors are further configured to be capable of executing the programmed instructions stored in the memory to provide a favorable or an unfavorable decision for the provided one or more features with the bias.

21. A method for monitoring and detecting bias in an application, the method comprising:
   indexing, by a bias monitoring computing system, training data;
   obtaining, by the bias monitoring computing system, a plurality of correlation values of one or more features in the indexed training data with a target variable, wherein for each of the one or more features:
   calculating a first value of correlation of the plurality of correlation values of the one of the one or more features and a favorable result of a judgement by a trained artificial intelligence model;
   calculating a second value of correlation of the plurality of correlation values of the one of the one or more features and a unfavorable result of a judgement by the trained artificial intelligence model;
   calculating, by the bias monitoring computing system, an absolute value of a difference between the calculated first value and the calculated second value; and
   calculating, by the bias monitoring computing system, a total sum of the calculated absolute value of the plurality of correlation values of the one of the one or more features;
   identifying, by a bias monitoring computing system, a feature from one or more features of a software application;
   determining, by the bias monitoring computing system, if there is a bias in the identified feature from the one or more features of the software application;
   determining, by the bias monitoring computing system, a favorable or an unfavorable decision when there is the bias determined in the identified feature; and
   providing, by the bias monitoring computing system, the identified feature with the determined bias and the determined favorable or an unfavorable decision.

22. The method as set forth in claim 21 further comprising, identifying and monitoring, by the bias monitoring computing system, a bias in the one or more features using the calculated first value, the second value, the absolute value, and the total sum.

\* \* \* \* \*